United States Patent [19]

Bombardier et al.

[11] Patent Number: 5,017,392

[45] Date of Patent: May 21, 1991

[54] SUGAR FREE CHOCOLATE COATING

[75] Inventors: Wanda K. Bombardier, Mechanicsville; Kim Ferryman, Richmond, both of Va.; Nessim Khalil, Waukesha, Wis.

[73] Assignee: Eskimo Pie Corporation, Richmond, Va.

[21] Appl. No.: 550,199

[22] Filed: Jul. 9, 1990

Related U.S. Application Data

[63] Continuation of Ser. No. 284,715, Dec. 14, 1988, abandoned.

[51] Int. Cl.$^5$ .............................. A23L 1/42
[52] U.S. Cl. .................... 426/659; 426/100; 426/101; 426/306; 426/548
[58] Field of Search ............ 426/100, 101, 306, 548, 426/95, 570, 98, 99, 103, 138, 139, 658, 659, 660, 661, 631, 593

[56] References Cited

U.S. PATENT DOCUMENTS

| | | | |
|---|---|---|---|
| Re. 30,722 | 8/1981 | Olds | 426/101 |
| 3,492,131 | 1/1970 | Schlatter | 426/548 |
| 3,737,322 | 6/1973 | Frey | 426/804 |
| 3,780,189 | 12/1973 | Scott | 426/548 |
| 3,959,516 | 5/1976 | Warkentin | 426/306 |
| 4,011,349 | 3/1977 | Riesen | 426/548 |
| 4,414,239 | 11/1983 | Oven | 426/659 |
| 4,626,441 | 12/1986 | Wolkstein | 426/548 |
| 4,701,337 | 10/1987 | Frost | 426/548 |

FOREIGN PATENT DOCUMENTS

| | | | |
|---|---|---|---|
| 551290 | 1/1958 | Canada | 426/631 |
| 672081 | 10/1963 | Canada | 426/631 |
| 969800 | 6/1975 | Canada | 426/306 |
| 59-132860 | 7/1984 | Japan | 426/101 |
| 60-94058 | 5/1985 | Japan . | |
| 60-102144 | 6/1985 | Japan | 426/631 |
| 1418544 | 12/1975 | United Kingdom | 426/306 |

OTHER PUBLICATIONS

Minifie 1980 Chocolate, Cocoa and Confectionary: Science and Technology Second Edition AVI Publishing Co. Inc. Westport CT pp. 41–43 and 45.

Polydextrose Reduced Calorie Bulking Agent 1983 Technical Information Pfizer Chemical Division, NY.

*Primary Examiner*—Carolyn Paden
*Attorney, Agent, or Firm*—Nies, Kurz, Bergert & Tamburro

[57] ABSTRACT

A sugar free chocolate coating for a frozen dairy dessert comprising aspartame, mannitol and polydextrose.

20 Claims, No Drawings

SUGAR FREE CHOCOLATE COATING

This application is a continuation of U.S. Ser. No. 284,715 filed Dec. 14, 1988 which is now abandoned.

BACKGROUND OF THE INVENTION

This invention relates generally to a chocolate coating for a dairy dessert and more particularly to a novel sugar free chocolate coating for use in conjunction with a sugar free frozen dairy dessert such as an ice cream bar, cone, or the like.

Consumer demand for lower calorie sugar free food items has led to the development of frozen dairy desserts in which all or a large portion of the normal sugar content is replaced by small amounts of artificial sweeteners such as sacharin and aspartame together with suitable bulking agents. The teachings of U.S. Pat. Nos. 3,492,131, 3,780,189 and 4,626,441 are pertinent to such developments and are incorporated herein for background purposes. In addition U.S. Pat. No. 3,737,322 discloses a low calorie chocolate coating wherein a low calorie arabinogalactan product may replace sugar on an equal weight basis. Reissue Pat. RE No. 30,722 discloses a conventional sugar chocolate coating.

However, this invention is directed to a specific need not addressed by those prior patents, that is, a sugar free chocolate coating containing aspartame (NutraSweet ®) for use on a sugar free dairy dessert bar, the coating closely simulating the taste, texture, mouthfeel, and color characteristics of the sugar chocolate coating conventionally applied on the dessert bar.

SUMMARY OF THE INVENTION

Accordingly the primary object of this invention is to provide a novel, sugar free chocolate coating particularly useful on frozen dairy desserts.

Another object of the invention is to provide the above novel sugar free chocolate coating which is acceptable in taste, texture, color, rate of flavor release, drying time, shelf life, producibility from a manufacturing standpoint and cost.

Still another object of the invention is to provide the above novel sugar free chocolate coating whose characteristics closely simulate those of the sugar chocolate coating conventionally applied on a frozen dessert bar.

A further object of the invention is to provide the above novel sugar free chocolate coating which comprises aspartame, mannitol, polydextrose and other ingredients in predetermined quantities to satisfy the criteria for acceptability indicated above.

DETAILED DESCRIPTION OF THE INVENTION

The rich, sugar free chocolate coating of the invention was developed to complement and enhance a popular and desirable sugar free frozen dairy dessert marketed by the assignee of this invention. It was necessary that the sugar free chocolate coating closely simulate the conventional sugar containing chocolate coating in taste, texture, smoothness, color, rate of flavor release, drying time, shelf life, producibility from a manufacturing standpoint, and cost.

The conventional coating contains non-fat dry milk solids, natural and dutch chocolate liquors, lecithin, black cocoa, coconut oil, and sugar (about 30%). The invention replaces the sugar with the combination of the artificial sweetener aspartame (NutraSweet ®), the bulking carbohydrate polydextrose, preferably polydextrose type K (Pfizer Co.), and the sugar alcohol mannitol which serves as a bulking agent and eliminates any aftertaste produced by the aspartame.

A series of tests evaluating taste, texture, mouthfeel, and overall acceptability performed on a number of different coating formulations has established the following ranges of ingredients for an acceptable sugar free chocolate coating of the invention:

| Ingredient | Range - % |
| --- | --- |
| Non-fat Dry Milk Solids (NFDM) | 4.5–10.0 |
| Chocolate Liquor | 16.0–19.1 |
| Mannitol | 5.0–10.0 |
| Lecithin | 0.35–0.5 |
| Polydextrose | 12.0–25.0 |
| Aspartame (NutraSweet ®) | 0.11–0.13 |
| Coconut Oil | 38.8–51.0 |
| Black Cocoa | 0.0–2.0 |

The non-fat dry milk solids affect the texture, smoothness and mouthfeel of the coating. The chocolate liquor provides flavor. Mannitol is a bulking agent that blends well with the chocolate and eliminates aspartame aftertaste. Lecithin is a wetting agent and emulsifier which reduces viscosity. The carbohydrate polydextrose provides bulk and thickness and affects dry time of the coating after deposition on the frozen dessert. NutraSweet ® affects flavor and sweetness. Coconut oil, preferably 76° coconut oil, determines consistency and viscosity and affects adhesion of the coating to the dessert and dry time. The black cocoa establishes color for aesthetic purposes.

The polydextrose used preferably is polydextose type K (Pfizer Co.) which is a dextrose/sorbitol condensation polymer with Potassium Bicarbonate at 1.26%, purchased in this form from Pfizer company. Before blending it with the other ingredients, it is milled to a size such that at least 90% passes through U.S. Sieve No. 80 and the balance through U.S. Sieve No. 60. This greatly facilitates the subsequent blending and processing with the other ingredients.

Initially, the following samples were prepared and evaluated using sorbitol rather than mannitol:

| | Sample No. | | | |
| --- | --- | --- | --- | --- |
| Ingredient (%) | 1 | 2 | 3 | 4 |
| NFDM | 13.0 | 14.5 | 5.4 | 4.5 |
| Natural Chocolate Liquor (Ghiradelli) | 8.0 | 10.0 | 12.1 | 12.1 |
| Dutch Chocolate Liquor (Ghiradelli) | 2.0 | 4.0 | 6.1 | 6.1 |
| Sorbitol | 5.0 | 2.5 | 9.0 | 9.0 |
| Lecithin | 0.5 | 0.5 | 0.4 | 0.5 |
| Polydextrose Type K | 3.0 | 5.5 | 20.3 | 6.1 |
| Aspartame (NutraSweet ®) | 0.2 | 0.1 | 0.12 | 0.12 |
| Blackshire Cocoa (black cocoa) | 0.25 | 0.25 | 1.2 | 1.2 |
| 76° Coconut Oil (Balance) | 63.3 | 62.5 | 45.4 | 60.38 |
| Maltrin M100 | 3.0 | — | — | — |
| Solka Floc 400 | 2.0 | — | — | — |

Sample No. 1 was too sweet and too weak in chocolate flavor. Sample No. 2 was too flat and bland. Sample No. 3 was acceptable, being rich and thick with good flavor. Sample No. 4 was less rich and slightly weak in flavor.

Because of some difficulties in milling the above samples, additional Samples No. 3(M) and 4(M), identical to Samples Nos. 3 and 4 except with mannitol replacing sorbitol, were prepared and evaulated. The milling difficulties were eliminated, and Sample No. 3(M) with mannitol was considered to be the most acceptable in satisfying the criteria noted above.

Having established Sample 3(M) as the preferred formulation, to further define acceptable ranges for the ingredients the following additional formulations were prepared and evaluated:

| INGREDIENTS % | SAMPLE NO. | | | | | | | | | | | | | | |
|---|---|---|---|---|---|---|---|---|---|---|---|---|---|---|---|
| | (3M) | 5 | 6 | 7 | 8 | 9 | 10 | 11 | 12 | 13 | 14 | 15 | 16 | 17 | 18 |
| Nonfat dry milk solids | 5.4 | 5.4 | 6.5 | 8.0 | 10.0 | 10.0 | 10.0 | 4.5 | 4.5 | 10.0 | 10.0 | 4.5 | 5.4 | 4.5 | 4.8 |
| Nat. Choc. liquor | 12.1 | 10.0 | 11.0 | 12.1 | 12.1 | 12.7 | 15.1 | 12.7 | 12.1 | 11.0 | 12.7 | 12.1 | 12.1 | 11.0 | 12.1 |
| Dutch Choc. liquor | 6.1 | 4.0 | 5.0 | 6.1 | 6.1 | 6.4 | 7.6 | 6.4 | 6.1 | 5.0 | 6.4 | 6.1 | 6.1 | 5.0 | 6.1 |
| Mannitol | 9.0 | 5.0 | 7.0 | 9.0 | 10.0 | 10.0 | 9.0 | 9.0 | 9.0 | 10.0 | 10.0 | 7.0 | 9.0 | 5.0 | 5.0 |
| Lecithin | 0.4 | 0.35 | 0.35 | 0.4 | 0.5 | 0.5 | 0.5 | 0.5 | 0.5 | 0.5 | 0.5 | 0.35 | 0.4 | 0.35 | 0.4 |
| Polydextrose-K | 20.3 | 15.0 | 18.0 | 15.0 | 12.0 | 15.0 | 18.0 | 18.0 | 18.0 | 18.0 | 20.3 | 30.0 | 20.3 | 18.0 | 25.0 |
| NutraSweet ® | 0.12 | 0.10 | 0.11 | 0.12 | 0.12 | 0.13 | 0.13 | 0.12 | 0.12 | 0.13 | 0.13 | 0.12 | 0.12 | 0.11 | 0.12 |
| Blackshire Cocoa | 1.2 | .75 | 1.0 | 1.2 | 1.2 | 1.2 | 0.75 | 1.2 | 1.2 | 1.2 | 1.2 | 0.75 | 2.0 | 1.0 | 1.2 |
| 76° coconut oil (balance) | 45.4 | 59.4 | 51.0 | 48.1 | 48.0 | 44.1 | 38.9 | 47.6 | 48.5 | 44.2 | 38.8 | 39.09 | 44.6 | 55.0 | 45.4 |

Samples 6-9, 11-14, 16 and 18 were found to be acceptable. However, Sample 3(M), containing the ingredients substantially proportioned as noted above, was still considered the best and preferred.

Sample No. 5 was not sweet enough, since the 0.1% level of NutraSweet ® was too low, and lacked flavor because of the low liquor level 14%. Sample No. 10 was bitter because of the high liquor level 22%. Sample No. 15 was too thick and difficult to process due to the high 30% level of polydextrose. Sample No. 17 was too oily and runny because of the high 55.0% level of coconut oil.

Additional tests have established that some substitutions may be made for some of the ingredients. For example, 0.0 to 3.5% milkfat can partially replace an equal amount of nonfat milk solids. From 0.0 to 8.0% cocoa butter can replace an equal amount of coconut oil. Natural and dutch cocoa powders can provide full replacement for the chocolate liquors. It is also contemplated that other vegetable oils such as soybean, cottonseed, plam kernel, palm oil, or combinations thereof and therewith may be substituted for coconut oil.

We claim:

1. A sugar-free chocolate coating for a frozen dairy dessert or the like comprising from 4.5 to 10% milk solids, from 16.0-19.1% chocolate flavoring substance, from 5.0-10.0% mannitol, from 0.35 to 0.5% lecithin, from 12.0 to 25.0% polydextrose, from 0.11 to 0.13% aspartame, from 0 to 2.0% black cocoa, from 0.0 to 8.0% cocoa butter, and the balance vegetable oil.

2. The sugar-free chocolate coating of claim 1, wherein said chocolate flavoring substance is chocolate liquor.

3. The sugar-free chocolate coating of claims 1 or 2, wherein said vegetable oil is coconut oil.

4. The sugar-free chocolate coating of claim 2, wherein said chocolate liquor is a combination of natural and dutch chocolate liquors.

5. The sugar-free chocolate coating of claim 3, wherein said chocolate liquor is a combination of natural and dutch chocolate liquors.

6. The sugar-free chocolate coating of claims 1, 2 or 3, wherein prior to mixing with the other ingredients, said polydextrose is sized so that at least 90% passes through U.S. Sieve No. 80 and the balance through U.S. Sieve No. 60.

7. The sugar-free chocolate coating of claim 6, wherein said polydextrose is polydextrose type K.

8. A sugar-free chocolate coating for a frozen dairy dessert or the like consisting of from 4.5 to 10% non fat milk solids, from 16.0-19.1% chocolate liquor, from 5.0 to 10.0% mannitol, from 0.35 to 0.5% lecithin, from 12.0 to 25.0% polydextrose, from 0.11 to 0.13% aspartame, from 0.0 to 2.0% black cocoa, and from 38.8 to 51% vegetable oil.

9. The sugar-free chocolate coating of claim 8, wherein said chocolate liquor is a combination of natural and dutch chocolate liquors.

10. The sugar-free chocolate coating of claims 8 or 9, wherein said vegetable oil is coconut oil.

11. The sugar-free chocolate coating of claims 8, 9 or 10, wherein prior to mixing with the other ingredients, said polydextrose is sized so that at least 90% passes through U.S. Sieve No. 80 and the balance through U.S. Sieve No. 60.

12. The sugar-free chocolate coating of claim 11, wherein polydextrose is polydextrose type K.

13. A sugar-free chocolate coating for a frozen dairy dessert consisting of the following ingredients approximately proportioned as follows: 5.4% non fat dry milk solids, 18.2% chocolate liquor, 9.0% mannitol, 0.4 lecithin, 20.3% polydextrose, 0.12% aspartame, 1.2% black cocoa, and the balance coconut oil.

14. The sugar-free chocolate coating of claim 13, wherein prior to mixing with the other ingredients, said polydextrose is sized so that at least 90% passes through U.S. Sieve No. 80 and the balance through U.S. Sieve No. 60.

15. The sugar-free chocolate coating of claim 14, wherein said polydextrose is polydextrose type K.

16. A sugar-free chocolate coating for a frozen dairy dessert or the like comprising an oil ingredient, milk solids, a chocolate flavoring substance, polydextrose, mannitol, aspartame, and other compatible coating ingredients.

17. The sugar-free chocolate coating of claim 16, wherein said aspartame is present in a small amount sufficient to provide an acceptable sweetness level.

18. The sugar-free chocolate coating of claim 17, wherein said polydextrose is present in an amount sufficient to provide acceptable bulk to said coating.

19. The sugar-free chocolate coating of claim 18, wherein said mannitol is present in an amount sufficient to add bulk and eliminate aftertaste from said coating.

* * * * *

UNITED STATES PATENT AND TRADEMARK OFFICE
CERTIFICATE OF CORRECTION

PATENT NO. : 5,017,392
DATED : May 21, 1991
INVENTOR(S) : Wanda K. Bombardier et al.

It is certified that error appears in the above-identified patent and that said Letters Patent is hereby corrected as shown below:

Claim 6, column 3, lines 64 and 65, change "claims 1, 2, or 3" to --claim 1--.

Claim 11, column 4, lines 31 and 32, change "claims 8, 9, or 10" to --claim 8--.

Add claim 20 as follows:

--20. The sugar-free chocolate coating of claim 16 wherein prior to mixing with the other ingredients, said polydextrose is sized so that at least 90% passes through U.S. Sieve No. 80 and the balance through U.S. Sieve No. 60.--

Signed and Sealed this

Twenty-ninth Day of September, 1992

*Attest:*

DOUGLAS B. COMER

*Attesting Officer*     *Acting Commissioner of Patents and Trademarks*

REEXAMINATION CERTIFICATE (3598th)

United States Patent [19]
Bombardier et al.

[11] B1 5,017,392
[45] Certificate Issued Aug. 11, 1998

[54] SUGAR FREE CHOCOLATE COATING

[75] Inventors: Wanda K. Bombardier, Mechanicsville; Kim Ferryman, Richmond, both of Va.; Nessim Khalil, Waukesha, Wis.

[73] Assignee: Eskimo Inc., Richmond, Va.

Reexamination Request:
No. 90/004,447, Nov. 7, 1996

Reexamination Certificate for:
Patent No.: 5,017,392
Issued: May 21, 1991
Appl. No.: 550,199
Filed: Jul. 9, 1990

Certificate of Correction issued Sep. 29, 1992.

Related U.S. Application Data

[63] Continuation of Ser. No. 284,715, Dec. 14, 1988, abandoned.
[51] Int. Cl.$^6$ ...................................... A23L 1/09
[52] U.S. Cl. .................... 426/659; 426/100; 426/101; 426/306; 426/548
[58] Field of Search ...................... 426/659, 100, 426/101, 306, 548, 95, 570, 98, 99, 103, 138, 139, 658, 660, 661, 631, 593

[56] References Cited

U.S. PATENT DOCUMENTS

| | | | |
|---|---|---|---|
| 3,766,165 | 10/1973 | Rennhard | . |
| 3,875,311 | 4/1975 | Eisenstadt | 426/212 |
| 3,876,794 | 4/1975 | Rennhard | 426/152 |
| 3,934,047 | 1/1976 | Schade | 426/548 |
| 4,024,290 | 5/1977 | Layton | 426/548 |
| 4,574,091 | 3/1986 | Steesen | 426/548 |
| 4,622,233 | 11/1986 | Torres | 426/548 |
| 4,626,441 | 12/1986 | Wolkstein | 426/548 |
| 4,664,927 | 5/1987 | Finkel | 426/330 |
| 4,810,516 | 3/1989 | Kong-Chan | 426/548 |
| 5,023,092 | 6/1991 | DuRoss | 426/3 |
| 5,085,876 | 2/1992 | Tsau | 426/92 |

FOREIGN PATENT DOCUMENTS

| | | |
|---|---|---|
| 551290 | 1/1954 | Canada . |
| 672081 | 9/1961 | Canada . |
| 969800 | 2/1972 | Canada . |
| 3441862 | 11/1984 | Germany . |
| 60-102144 | 6/1985 | Japan . |
| 63-12263 | 1/1988 | Japan . |
| 1418544 | 9/1973 | United Kingdom . |
| 8501421 | 4/1985 | WIPO . |

OTHER PUBLICATIONS

"Developments in Dielectric Chocolate", Confectionary Manufacturing and Marketing, vol. 24, No. 10 (Oct. 1987).

Fennema 1985 Food Chemistry 2nd Ed—Marcel Dekker Inc New York pp. 658–660.

Searle Technical Bulletin, "The NutraSweet Breakthrough", 1982.

*Primary Examiner*—Carolyn Paden

[57] ABSTRACT

A sugar free chocolate coating for a frozen dairy dessert comprising aspartame, mannitol and polydextrose.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–15 is confirmed.

Claims 1, 8, and 16 are determined to be patentable as amended.

Claims 2–7, 9–12 and 17–20, dependent on an amended claim, are determined to be patentable.

1. A sugar-free chocolate coating for a frozen dairy dessert [or the like] comprising from 4.5 to 10% milk solids, from 16.0–19.1% chocolate flavoring substance, from 5.0–10.0% mannitol, from 0.35 to 0.5% lecithin, from 12.0 to 25.0% polydextrose, from 0.11 to 0.13% aspartame, from 0 to 2.0% black cocoa, from 0.0 to 8.0% cocoa butter, and the balance vegetable oil.

8. A sugar-free chocolate coating for a frozen dairy dessert [or the like] consisting of from 4.5 to 10% non fat milk solids, from 16.0–19.1% chocolate liquor, from 5.0 to 10.0% mannitol, from 0.35 to 0.5% lecithin, from 12.0 to 25.0% polydextrose, from 0.11 to 0.13% aspartame, from 0.0 to 2.0% black cocoa, and from 38.8 to 51% vegetable oil.

16. A sugar-free chocolate coating for a frozen dairy dessert [or the like] comprising an oil ingredient, milk solids, a chocolate flavoring substance, polydextrose, mannitol, aspartame, and other compatible coating ingredients.

* * * * *